US012173545B2

(12) United States Patent
Zheng et al.

(10) Patent No.: US 12,173,545 B2
(45) Date of Patent: Dec. 24, 2024

(54) DOOR OPENING DEVICE AND STORAGE EQUIPMENT

(71) Applicants: HEFEI MIDEA REFRIGERATOR CO., LTD., Anhui (CN); HEFEI HUALING CO., LTD., Anhui (CN); MIDEA GROUP CO., LTD., Guangdong (CN)

(72) Inventors: Tao Zheng, Anhui (CN); Yang Li, Anhui (CN); Yingjie Ma, Anhui (CN)

(73) Assignees: HEFEI MIDEA REFRIGERATOR CO., LTD., Anhui (CN); HEFEI HUALING CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/000,664

(22) PCT Filed: Dec. 29, 2021

(86) PCT No.: PCT/CN2021/142507
§ 371 (c)(1),
(2) Date: Dec. 22, 2022

(87) PCT Pub. No.: WO2022/262251
PCT Pub. Date: Dec. 22, 2022

(65) Prior Publication Data

US 2024/0229536 A1 Jul. 11, 2024

(30) Foreign Application Priority Data

Jun. 18, 2021 (CN) ......................... 202110677903.3

(51) Int. Cl.
*E05F 15/60* (2015.01)

(52) U.S. Cl.
CPC ......... *E05F 15/60* (2015.01); *E05Y 2201/462* (2013.01); *E05Y 2600/61* (2013.01); *E05Y 2600/624* (2013.01); *E05Y 2900/20* (2013.01)

(58) Field of Classification Search
CPC ............... E05F 15/16; E05Y 2201/462; E05Y 2600/61; E05Y 2600/624; E05Y 2900/20
(Continued)

(56) References Cited

U.S. PATENT DOCUMENTS 3,354,583 A * 11/1967 Moorman ........... E05B 17/0029 292/201
3,605,459 A * 9/1971 Dalen ................. E05B 47/0038 292/144
(Continued)

FOREIGN PATENT DOCUMENTS

CN 1462657 A * 12/2003
CN 204697293 U 10/2015
(Continued)

*Primary Examiner* — Jerry E Redman
(74) *Attorney, Agent, or Firm* — Seed IP Law Group LLP

(57) ABSTRACT

The present application relates to the field of storage equipment and provides a door opening device and storage equipment. The door opening device includes a plurality of electromagnetic push rod structures, where each of the plurality of electromagnetic push rod structures includes a push rod; and a controller electrically connected to the plurality of electromagnetic push rod structures and is configured to drive a plurality of push rods of the plurality of electromagnetic push rod structures to act synchronously. The door opening device according to the present application can reduce the thickness of the door opening device to a large extent under the condition of ensuring the pushing force through synchronous action of the plurality of electromagnetic push rod structures arranged in parallel, which is helpful to improve the application range of the door opening device.

16 Claims, 5 Drawing Sheets

(58) Field of Classification Search
USPC .......................................................... 49/364
See application file for complete search history.

(56) References Cited

U.S. PATENT DOCUMENTS

| | | | | |
|---|---|---|---|---|
| 6,338,536 | B1 * | 1/2002 | Ueno | E05F 15/60 49/478.1 |
| 8,297,725 | B2 * | 10/2012 | Kim | F25D 23/028 49/276 |
| 8,444,237 | B2 * | 5/2013 | Kang | F25D 23/028 312/319.2 |
| 8,469,469 | B2 * | 6/2013 | Kim | F25D 23/028 49/276 |
| 8,997,402 | B2 * | 4/2015 | Mao | A47B 96/00 49/400 |
| 10,190,815 | B2 * | 1/2019 | Kempfle | E05F 15/616 |
| 10,633,893 | B2 * | 4/2020 | Harajli | E05B 81/20 |
| 2010/0124343 | A1 | 5/2010 | Zhang | |
| 2019/0203508 | A1 * | 7/2019 | Harajli | E05F 15/616 |
| 2024/0229536 | A1 * | 7/2024 | Zheng | E05F 15/60 |

FOREIGN PATENT DOCUMENTS

| | | | | | |
|---|---|---|---|---|---|
| CN | 105282671 | A | | 1/2016 | |
| CN | 105874116 | A | * | 8/2016 | D06F 39/14 |
| CN | 107484051 | A | | 12/2017 | |
| CN | 106014062 | B | * | 6/2018 | |
| CN | 108487962 | A | * | 9/2018 | F01L 1/08 |
| CN | 108661454 | A | * | 10/2018 | A47L 15/4259 |
| CN | 111037526 | A | * | 4/2020 | B25H 3/022 |
| CN | 111089045 | A | * | 5/2020 | |
| CN | 111372179 | A | | 7/2020 | |
| CN | 113250574 | A | * | 8/2021 | E05F 15/60 |
| CN | 214740604 | U | * | 11/2021 | |
| CN | 113932913 | A | * | 1/2022 | |
| DE | 102007041618 | A1 | | 3/2009 | |
| DE | 102017210707 | A1 | * | 12/2018 | |
| EP | 1077354 | A2 | * | 2/2001 | E05B 17/0033 |
| EP | 4160026 | A1 | * | 4/2023 | F15B 15/088 |
| JP | 2001059379 | A | | 3/2001 | |
| JP | 2016031193 | A | | 3/2016 | |
| WO | WO 2015001325 | A1 | | 1/2015 | |

* cited by examiner

DOOR OPENING DEVICE AND STORAGE EQUIPMENT

CROSS-REFERENCE TO RELATED APPLICATION

The present application claims priority to Chinese patent application No. 202110677903.3 filed on Jun. 18, 2021, entitled "Door Opening Device and Storage equipment", which is hereby incorporated by reference in its entirety.

TECHNICAL FIELD

The present application relates to the field of storage equipment manufacture, and in particular to a door opening device and a storage equipment.

BACKGROUND

Cabinet doors of some storage equipment (like refrigerators) in the related art are sealed with door seals, such as soft door seals with magnetic strips. A certain pulling force needs to be applied to open the cabinet doors due to the pressure difference between the interior and exterior of the storage equipment and the adsorption force of the door seals on the cabinet body if the cabinet doors are closed. In order to open the door automatically, an electromagnetic push rod structure is introduced into the storage equipment to open the door. However, since the pushing force of the electromagnetic push rod type door opening device is basically positive related to its volume, a larger electromagnetic push rod structure needs to be designed to open the door stably, which will affect the height of the entire storage equipment and is difficult to popularize.

SUMMARY

The present application is intended to solve at least one of the problems existing in the related art. The present application provides a door opening device, which can provide a larger driving force even when the thickness of the door opening device is small.

The present application further provides a storage equipment.

According to the present application, an embodiment provides a door opening device, including:

- a plurality of electromagnetic push rod structures, where each of the plurality of electromagnetic push rod structures includes a push rod; and
- a controller, electrically connected to the plurality of electromagnetic push rod structures and configured to drive push rods of the plurality of electromagnetic push rod structures to act synchronously.

In the door opening device according to the embodiment of the present application, the thickness of the door opening device to a large extent can be reduced under the condition of ensuring the pushing force through synchronous action of the plurality of electromagnetic push rod structures arranged in parallel, which is helpful to improve the application range of the door opening device.

According to an embodiment of the present application, the door opening device further includes:

- an output joint, where each of the push rods is connected to the output joint.

In the door opening device according to the embodiments of the present application, the output of the door opening device is more uniform. In the long-term use process, even if a wear or looseness occurs among the plurality of electromagnetic push rod structures, the opening of a single cabinet door by the door opening device will not be affected, and especially the cabinet door or cabinet body will not be impacted by plurality of push rods, which helps to enhance the durability of the door opening device.

According to an embodiment of the present application, at least one of a plurality of push rods is connected to the output joint in a position-adjustable manner along a moving direction of the push rod.

In the door opening device according to the embodiments of the present application, the total stroke can remain unchanged, and the abundant driving force in the middle and rear section of the stroke can be allocated to the front section of the stroke, and then the driving force at the initial position becomes larger. Due to the increase of driving force in the early stage, the thickness of the electromagnetic push rod structure can be made smaller, which makes the door opening device more practical.

According to an embodiment of the present application, at least one of the push rods includes a threaded rod which passes through the output joint, and the threaded rod is connected to the output joint in a position-adjustable manner through nuts on both sides of the output joint.

According to an embodiment of the present application, at least one of the push rods comprises an adjusting rod which passes through the output joint, the adjusting rod includes a positioning surface extending along the moving direction of each push rod, the output joint is provided with a positioning hole communicating with the positioning surface, the adjusting rod is connected to the output joint in an adjustable manner through a positioning member, and the positioning member passes through the positioning hole and abuts against the positioning surface.

According to an embodiment of the present application, the output joint includes:

- a connecting rod, connected to the plurality of push rods; and
- an output rod, connected to the connecting rod, and at least portion of the output rod protrudes towards a direction away from the push rods relative to the connecting rod.

According to an embodiment of the present application, the output joint further includes:

- a buffer head, provided at a working end of the output rod.

According to an embodiment of the present application, the connecting rod is provided with a connecting hole, a tail end of each push rod is provided with a stepped connecting shaft, and the connecting shaft passes through the connecting hole and is connected to the connecting rod.

According to an embodiment of the present application, the door opening device further includes:

- a base, provided with a mounting position for mounting the door opening device, and the plurality of electromagnetic push rod structures are mounted on the base.

According to an embodiment of the present application, the door opening device further includes: a connecting rib, connected to the plurality of electromagnetic push rod structures and the base.

According to the present application, an embodiment provides a storage equipment, including:

- a cabinet body;
- a cabinet door, mounted on the cabinet body in an openable and closable manner;
- any one of the door opening device mentioned above, where the door opening device is mounted on one of the cabinet body and the cabinet door, and the push rods are configured to push another of the cabinet body and the cabinet door.

According to the storage equipment according to the embodiments of the present application, a door opening device with a smaller thickness can be used and a larger push force can be obtained through the synchronous action of plurality of electromagnetic push rod structures arranged in parallel. The height of the entire storage equipment is decreased, which is convenient for transportation and mount.

According to an embodiment of the present application, the door opening device is mounted on the cabinet body, and the plurality of push rods are configured to push the same cabinet door; or the door opening device is mounted on the same cabinet door, and the plurality of push rods are configured to push the cabinet body The above one or more solutions in the embodiments of the present application have at least one of the following technical effects.

The thickness of the door opening device can be reduced to a large extent under the condition of ensuring the pushing force through synchronous action of plurality of electromagnetic push rod structures arranged in parallel, which is helpful to improve the application range of the door opening device.

Further, by providing the push rod with an adjustable stroke, the total stroke of the door opening device can remain unchanged, and the abundant driving force in the middle and rear section of the stroke can be allocated to the front section of the stroke, and then the driving force at the initial position becomes larger. Due to the increase of driving force in the early stage, the thickness of the electromagnetic push rod structure can be made smaller, which makes the door opening device more practical.

The additional aspects and advantages of the present application will be set forth in part in the description which follows, and some thereof will be apparent from the following description, or be learned by the practice of the present application.

BRIEF DESCRIPTION OF THE DRAWINGS

In order to more clearly illustrate the solutions according to the present application or the related art, the accompanying drawings used in the description of the embodiments of the present application or the related art will be briefly introduced below. It should be noted that the drawings in the following description are only part embodiments of the present application. For those of ordinary skill in the art, other drawings can also be obtained according to these drawings without creative efforts.

REFERENCE NUMERALS

Figure 1:
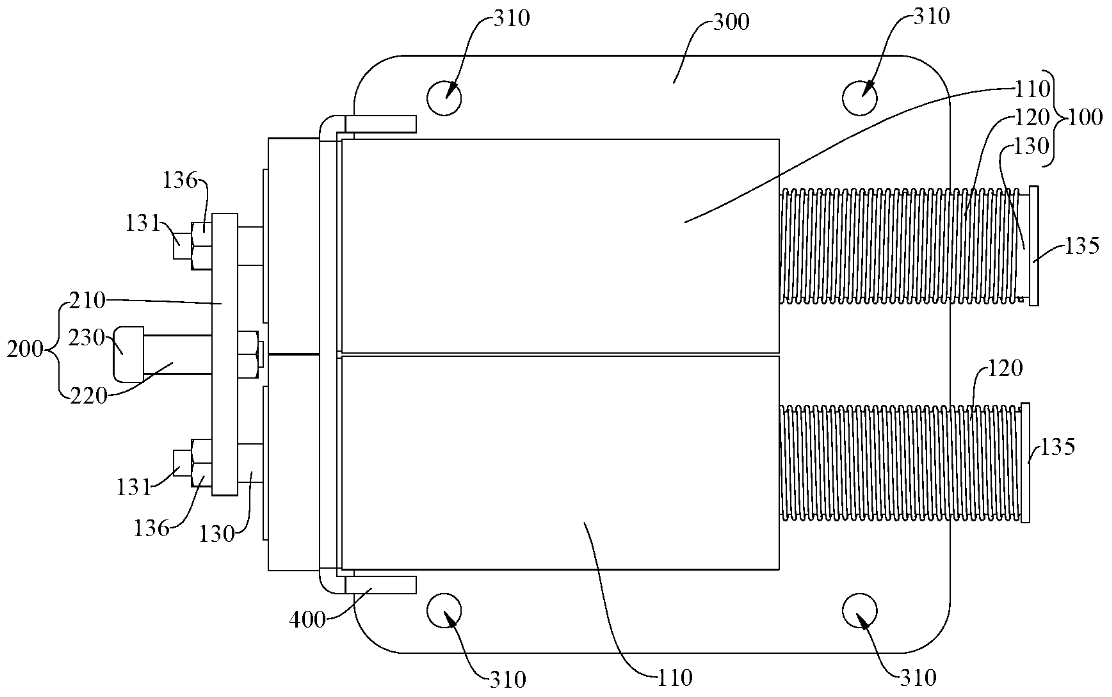
FIG. 1 is a first schematic structural diagram of a door opening device according to an embodiment of the present application.

100—electromagnetic push rod structure; 110—solenoid; 120—elastic reset member; 130—push rod; 131—connecting shaft; 132—threaded rod; 134—positioning surface; 135—stopper; 136—nut; 137—positioning member; 200—output joint; 210—connecting rod; 220—output rod; 230—buffer head; 300—base; 310—mounting position; 400—connecting rib.

DETAILED DESCRIPTION

The implementations of the present application are further described in detail below in conjunction with the accompanying drawings and embodiments. The following embodiments are intended to illustrate the present application, but are not intended to limit the scope of the present application.

In the description of the embodiments of the present application, it should be noted that, the orientation or positional relations indicated by terms such as "center", "longitudinal", "transverse", "upper", "lower", "front", "rear", "left", "right", "vertical", "horizontal", "top", "bottom", "inner", "outer" and the like are based on the orientation or positional relations shown in the drawings, which are merely convenience of description of the embodiments of the present application and to simplify description, but does not indicate or imply that the stated device or element must have the particular orientation, or be constructed and operated in a particular orientation, and thus it is not to be construed as limiting the embodiments of the present application. Furthermore, the terms "first", "second" and "third" are used for descriptive purposes only and should not be construed as indicating or implying a relative importance.

In the description of the embodiments of the present application, it should be noted that unless explicitly stated and defined otherwise, the terms "connected to" and "connected" shall be understood broadly, for example, it may be either fixedly connected or detachably connected, or can be integrated; it may be either mechanically connected, or electrically connected; it may be either directly connected or indirectly connected through an intermediate medium. The specific meanings of the terms above in the embodiments of the present application can be understood by a person skilled in the art in accordance with specific conditions. In the embodiments of the present application, unless explicitly stated and defined otherwise, a first feature being "up" or "down" a second feature may mean that the first feature is directly contacted with the second feature, or the first feature and the second feature are indirectly contacted through an intermediate medium. Also, a first feature being "above", "over" and "on" a second feature may mean that the first feature is directly above or obliquely above the second feature, or simply means that a level of the first feature is higher than that of the second feature. A first feature being "below", "under" and "down" a second feature may mean that the first feature is directly below or obliquely below the second feature, or simply means that a level of the first feature is lower than that of the second feature.

In the description of this specification, the reference terms such as "an embodiment", "some embodiments", "example", "specific example", or "some examples", and the like mean that specific feature, structure, material or characteristic described in conjunction with the embodiment or example is included in at least one embodiment or example of the present application. In this description, schematic expressions of the above terms are not necessarily directed to the same embodiment or example. Furthermore, the described specific feature, structure, material or characteristic can be combined in any suitable manner in any one or more embodiments or examples. In addition, those skilled in the art can combine various embodiments or examples and features in various embodiments or examples described in this description unless they are contradictory.

The door opening device according to the embodiments of the present application will be described below in conjunction with FIGS. 1 to 10.

When a push rod 130 of an electromagnetic push rod structure 100 of the door opening device acts, the cabinet door can be opened automatically. For example, the door opening device can be used in storage equipment, and when the push rod 130 of the electromagnetic push rod structure 100 acts, it can provide a driving force for driving the cabinet door to be opened between the cabinet door and the cabinet body.

As shown in the FIGS. 1 to 10, the door opening device according to example embodiments of the present application includes the electromagnetic push rod structure 100 and a controller (not shown in the figures).

The electromagnetic push rod structure 100 includes the push rod 130, a solenoid 110 and an elastic reset member 120.

The push rod 130 is made of magnetic material. The solenoid 110 includes a winding coil and the solenoid 110 is sleeved outside the push rod 130. The elastic reset member 120 is elastically connected between the solenoid 110 and the push rod 130.

In some embodiments, as shown in FIGS. 1 to 10, the push rod 130 passes through the solenoid 110, where a working end of the push rod 130 passes through the solenoid 110 from a first end (left end shown in the figures) of the solenoid 110, the working end of the push rod 130 is used to push the cabinet door or the cabinet body, and the other end of the push rod 130 passes through the solenoid 110 from a second end (right end shown in the figures) of the solenoid 110.

The elastic reset member 120 can be a coil spring. The elastic reset member 120 can be sleeved on a section of the push rod 130 extending out of the second end of the solenoid 110, the other end of the push rod 130 can be provided with a stopper 135, and the elastic reset member 120 can elastically stop and abut against between the second end of the solenoid 110 and the stopper 135.

The stopper 135 can be integrally formed at the other end of the push rod 130, and the stopper 135 can be a center boss surrounding the peripheral wall of the push rod 130.

Alternatively or additionally, the stopper 135 can be integrally formed at the other end of the push rod 130. The stopper 135 can be a plurality of bosses provided on the peripheral wall of the push rod 130, and the plurality of bosses can be provided circumferentially around the peripheral wall of the push rod 130.

Alternatively or additionally, the stopper 135 can be a circlip or other spare part clamped at the other end of the push rod 130.

Figure 2:
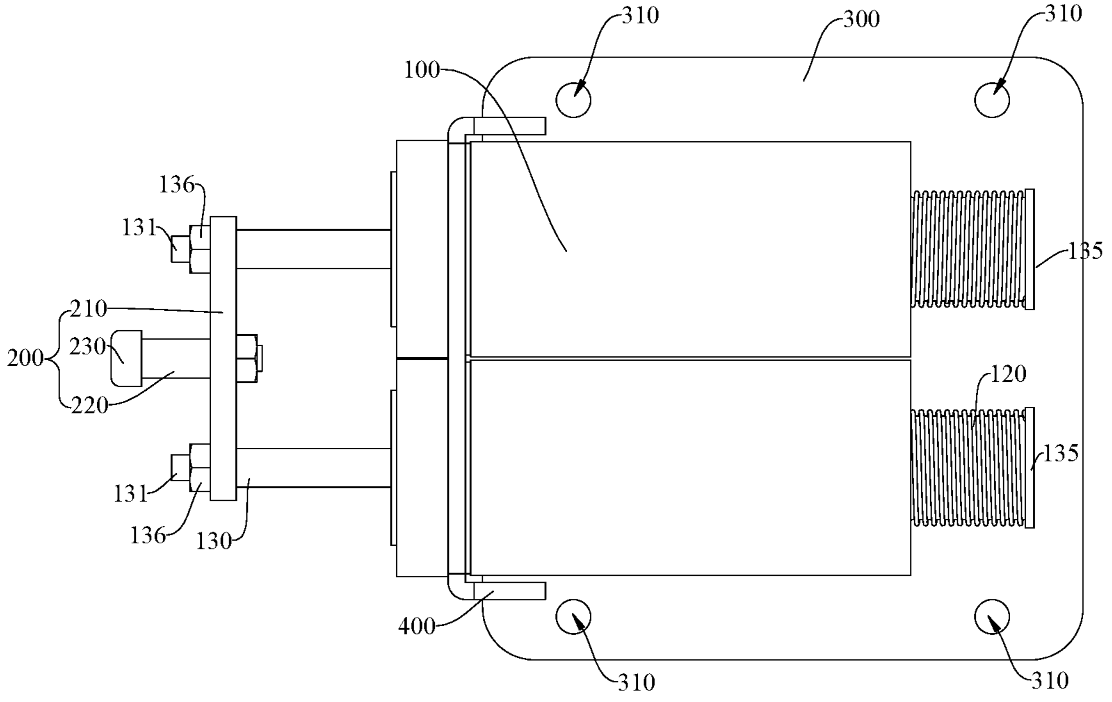
FIG. 2 is a second schematic structural diagram of the door opening device according to an embodiment of the present application.
Figure 3:
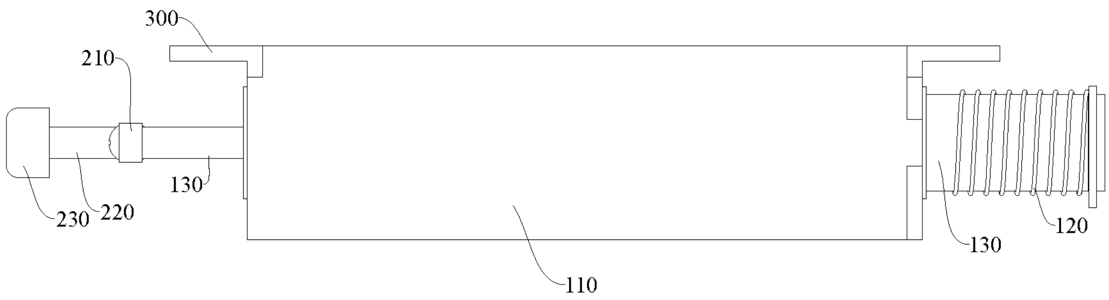
FIG. 3 is a third schematic structural diagram of the door opening device according to an embodiment of the present application.
Figure 4:
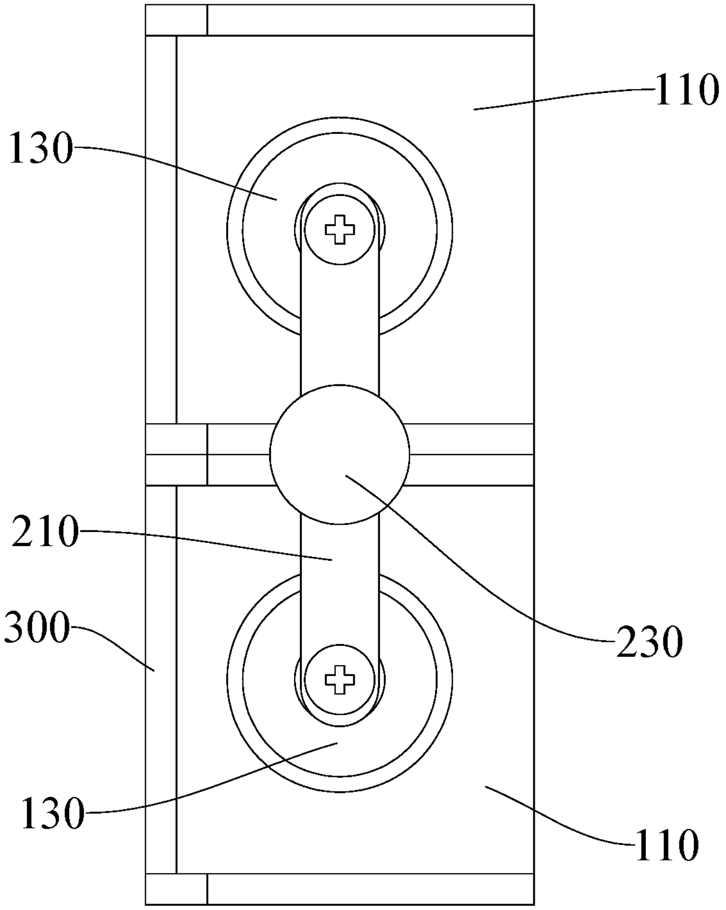
FIG. 4 is a fourth schematic structural diagram of the door opening device according to an embodiment of the present application.
Figure 5:
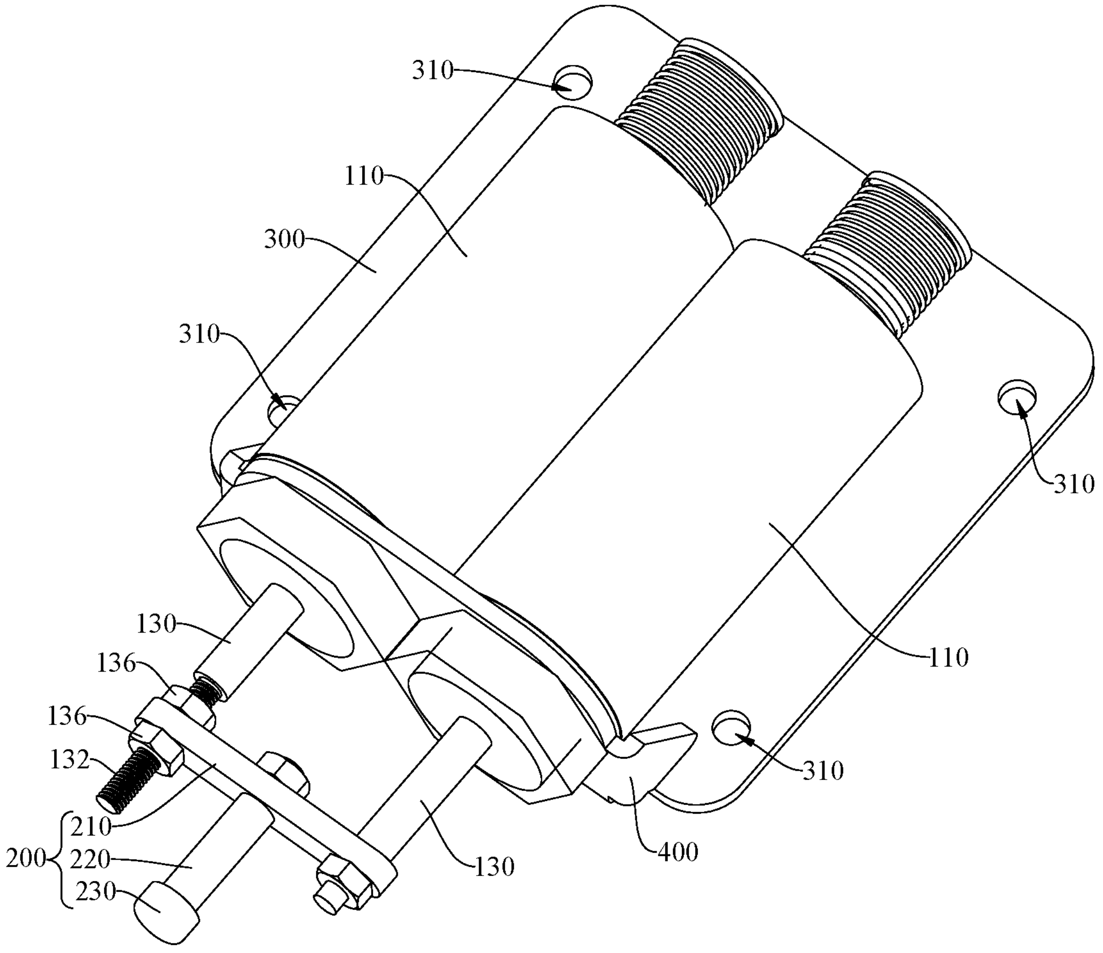
FIG. 5 is a fifth schematic structural diagram of the door opening device according to an embodiment of the present application.
Figure 6:
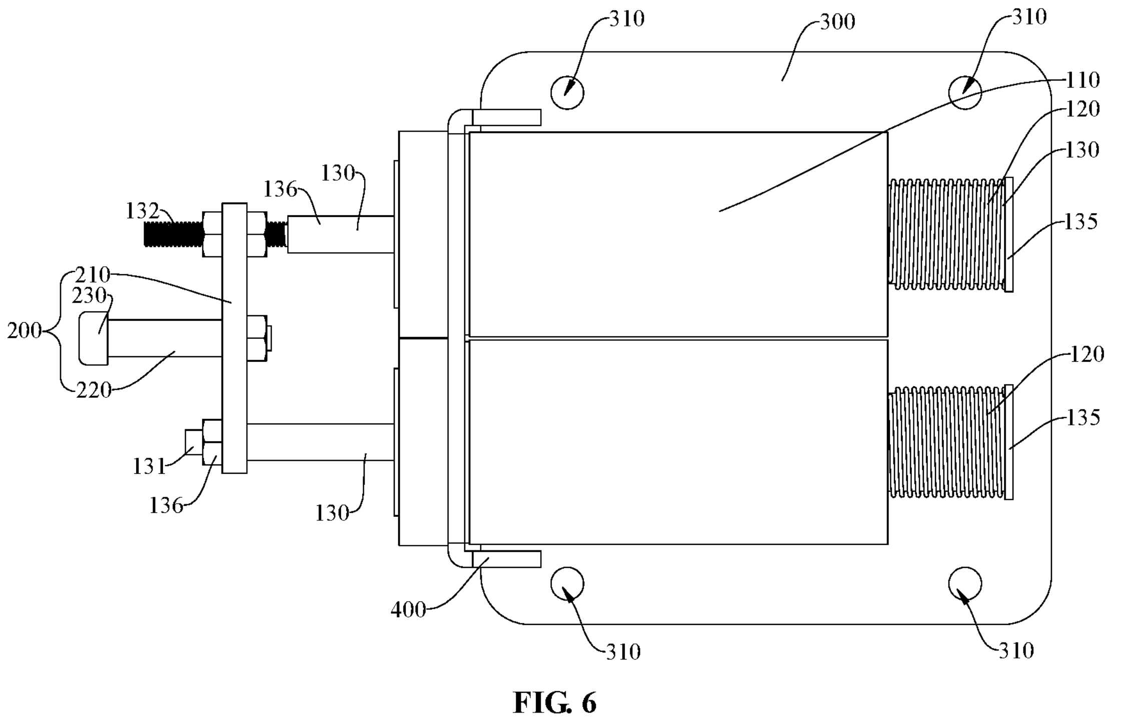
FIG. 6 is a sixth schematic structural diagram of the door opening device according to an embodiment of the present application.

When the solenoid is energized, a magnetic field can be generated in the solenoid, and then the push rod 130 can move in a straight line under the action of the magnetic field. As shown in FIG. 2, the push rod 130 resists the elastic force of the elastic reset member 120 and moves to the left. The push rod 130 drives the elastic reset member 120 to compress, and then a driving force for driving the opening of the cabinet door is provided between the cabinet door and the cabinet body through the linear motion of the push rod 130.

When the solenoid is powered off, the magnetic field in the solenoid disappears. As shown in FIG. 1, the push rod 130 resets under the drive of the elastic force of the elastic reset member 120, and the push rod 130 moves to the right.

The number of the electromagnetic push rod structures 100 is multiple, and the plurality of electromagnetic push rod structures 100 are arranged side by side and connected in parallel. Each of the electromagnetic push rod structures 100 includes a push rod 130, and the plurality of electromagnetic push rod structures 100 are used to drive the same cabinet door to be opened.

For example, each electromagnetic push rod structure 100 is mounted on the same cabinet door, or each electromagnetic push rod structure 100 is mounted on the same cabinet body, and the working end of the push rod 130 of each electromagnetic push rod structure 100 is used to push the same cabinet door.

FIGS. 1 to 10 are illustrated by taking two electromagnetic push rod structures 100 as an example. It should be noted that the number of electromagnetic push rod structures 100 can also be three, four, five or more.

The controller is electrically connected to the plurality of electromagnetic push rod structures 100, and is configured to drive the push rods 130 of the plurality of electromagnetic push rod structures 100 to act synchronously.

The controller can be a controller integrated in the electromagnetic push rod structure 100 or an independent controller relative to the electromagnetic push rod structure 100.

The controller can be in the form of a circuit board.

The controller can be provided with a control switch, one end of the control switch is used for connecting a power supply, and the other end of the control switch is connected to the plurality of electromagnetic push rod structures 100.

When the controller receives a control command, it can supply power to the plurality of electromagnetic push rod structures 100 synchronously, to make the push rods 130 of the plurality of electromagnetic push rod structures 100 act to drive the cabinet door to be opened.

It should be noted that when the cabinet door is closed, due to the inertial force caused by the weight of the cabinet door itself, the pressure difference between the inside and outside of the cabinet door and/or the adsorption force between the cabinet door and the cabinet body, the cabinet door can only be opened when the driving force received is greater than the target threshold.

In the related art, there are some applications of electromagnetic push rod structure 100 in the use of the door opening device. However, in order to ensure that the pushing force of the electromagnetic push rod structure 100 exceeds a target threshold, the electromagnetic push rod structure 100 needs to be made larger, which mainly caused by that greater number of coils wound in the solenoid 110, which results in the larger diameter of the solenoid 110.

In the above art, the height of the entire storage equipment will be increased, which will affect the transportation and mount of the storage equipment. Especially for some storage equipment with large volume, it is difficult for the electromagnetic push rod structure 100 to be used in the door opening device of the storage equipment with large volume due to larger target threshold values for opening their cabinet doors.

In the door opening device according to the embodiments of the present application, since the plurality of electromagnetic push rod structures 100 are arranged in parallel, each electromagnetic push rod structure 100 can be set to be a small volume, and then a resultant force of the plurality of electromagnetic push rod structures 100 can also reach the target threshold. In this way, the door opening device according to the embodiments of the present application can be applied to the storage equipment with large target threshold value of door opening force, thus helping to simplify the user's operation difficulty.

In the door opening device according to the embodiments of the present application, the thickness of the door opening device to a large extent can be reduced under the condition of ensuring the pushing force through synchronous action of plurality of electromagnetic push rod structures 100 arranged in parallel, which is helpful to improve the application range of the door opening device.

In some embodiments, as shown in FIGS. 1 to 10, the door opening device can further include an output joint 200, and each push rod 130 is connected to the output joint 200.

In other words, plurality of electromagnetic push rod structures 100 output driving force through the same output joint 200, to make the output of the door opening device is more uniform. In the long-term use process, even if a wear or looseness occurs between the plurality of electromagnetic push rod structures 100, the opening of a single cabinet door by the door opening device will not be affected, and especially the cabinet door or cabinet body will not be impacted by plurality of push rods 130, which is helpful to enhance the durability of the door opening device.

In the embodiments shown in FIGS. 1 to 10, the push rods 130 of the two electromagnetic push rod structures 100 are connected to the output joint 200 and a driving force is output through the output joint 200. In the embodiment where the door opening device includes more electromagnetic push rod structures 100, the push rod 130 of each of the electromagnetic push rod structures 100 is connected to the output joint 200 and a driving force is output through the output joint 200.

As shown in FIGS. 1 to 10, the output joint 200 can include a connecting rod 210 and an output rod 220.

The connecting rod 210 is connected to a plurality of push rods 130. As shown in FIGS. 1 to 10, the connecting rod 210 extends along the arrangement direction of the plurality of electromagnetic push rod structures 100, so that each push rod 130 can be connected to the connecting rod 210.

For example, in some embodiments, the connecting rod 210 is provided with a connecting hole, which is a through hole passing through the connecting rod 210, a tail end of the push rod 130 is provided with a stepped connecting shaft 131, and the diameter of the connecting shaft 131 is smaller than the diameter of the main body part of the push rod 130, so that a step surface for limiting is formed at the joint of the connecting shaft 131 and the main body part of the push rod 130. The connecting shaft 131 penetrates through the connecting hole, and the connecting shaft 131 is connected to the connecting rod 210.

For example, in the embodiments shown in FIGS. 1 to 4, a portion of the connecting shaft 131 is provided with an external thread section. The connecting shaft 131 penetrates through the connecting hole of the connecting rod 210 until the step surface abuts against the connecting rod 210. The smooth section of the connecting shaft 131 is aligned with the connecting hole, the external thread section of the connecting shaft 131 extends out of the connecting hole, and then the push rod 130 can be connected to the connecting rod 210 by threaded fit between a nut 136 and the external thread section.

For example, in the embodiments shown in FIGS. 5 to 8, the connecting shaft 131 includes a threaded rod 132 which is screwed into a first nut 136. The threaded rod 132 penetrates through the connecting hole of the connecting rod 210 until the first nut 136 abuts against the connecting rod 210. The threaded rod 132 extends out of the connecting hole, and then the push rod 130 can be connected to the connecting rod 210 through threaded fit between a second nut 136 and the threaded rod 132.

Figure 9:
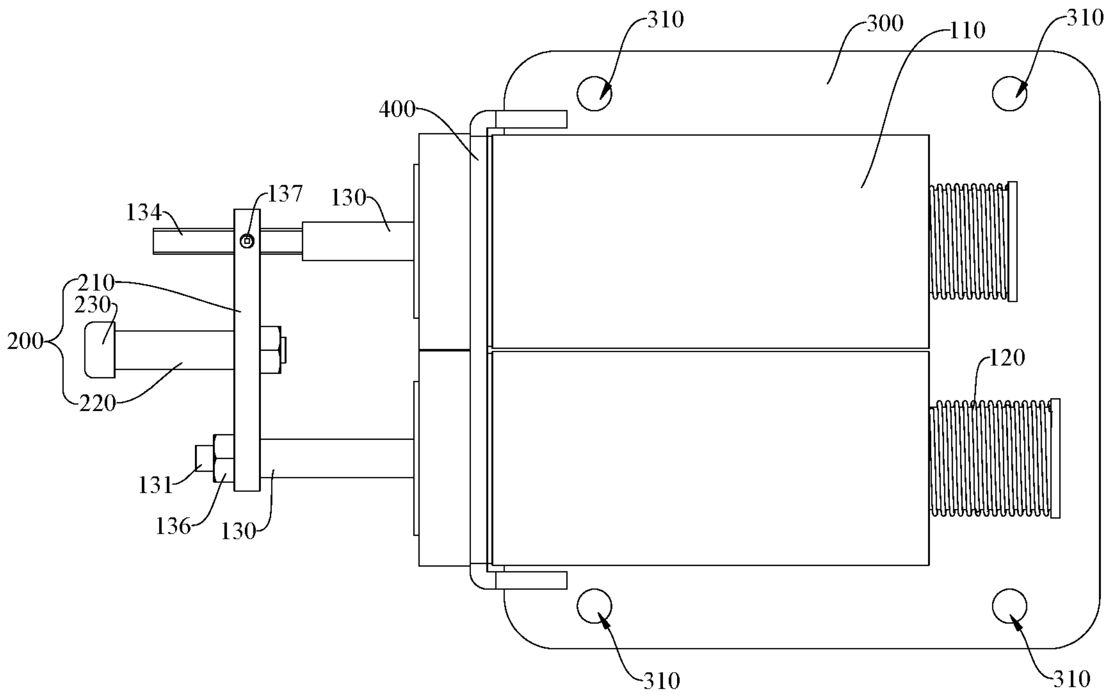
FIG. 9 is a ninth schematic structural diagram of the door opening device according to an embodiment of the present application.

For example, in the embodiment shown in FIG. 9, the connecting shaft 131 includes an adjusting rod. A circumferential wall on one side of the adjusting rod is disposed as a plane to form a positioning surface 134. For example, the cross section of the adjusting rod can be D-shaped. The adjusting rod penetrates through the connecting hole of the connecting rod 210. The connecting rod 210 is provided with a positioning hole communicating with the connecting hole. A positioning member 137 extends from the positioning hole and abuts against the positioning surface 134 of the adjusting rod, and thus the push rod 130 can be connected to the connecting rod 210.

The positioning hole can be a threaded hole, and the positioning member 137 can be a screw, such as a flat head screw. Alternatively and additionally, the positioning hole can be a wedged hole, and the positioning member 137 can be a wedged pin.

The positioning surface 134 can be provided with anti-skid patterns, including a plurality of straight patterns or grid patterns arranged in parallel.

Figure 10:
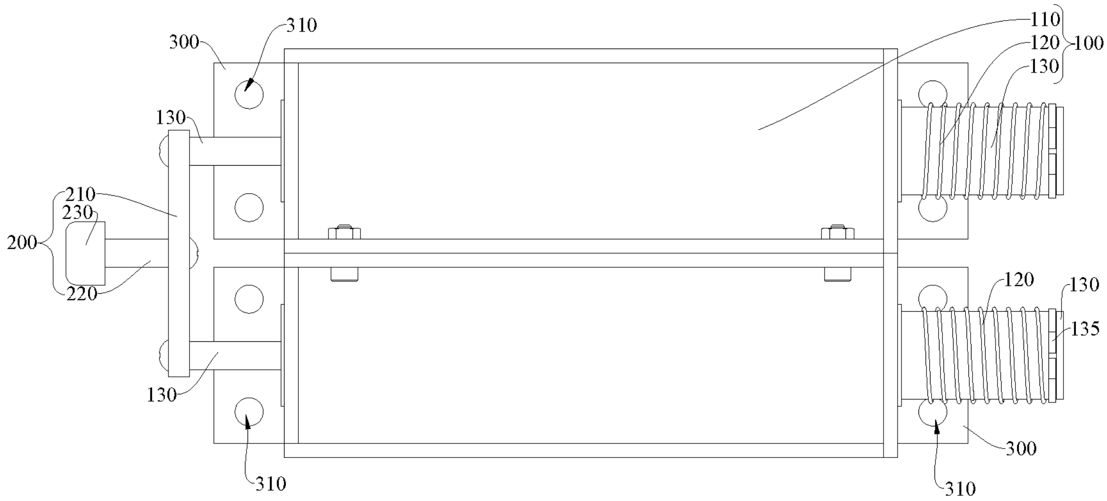
FIG. 10 is a tenth schematic structural diagram of the door opening device according to an embodiment of the present application.

For example, in the embodiment shown in FIG. 10, an end surface of the connecting shaft 131 is provided with a threaded hole. The connecting shaft 131 penetrates through the connecting hole of the connecting rod 210, and a threaded connecting member is in threaded connection with the threaded hole, thus the push rod 130 can be connected to the connecting rod 210.

As shown in FIGS. 1 to 10, the output rod 220 is connected to the connecting rod 210, and at least portion of the output rod 220 protrudes towards the direction away from the push rod 130 relative to the connecting rod 210. In this way, the output rod 220 can push the cabinet door or cabinet body to move. For example, the working end of the output rod 220 can push the cabinet door or cabinet body to move.

In this way, the driving force outputted from the push rod 130 of each of the electromagnetic push rod structures 100 can be outputted through the output rod 220, especially when there is only one working end of the output rod 220, in the door opening device, the driving forces of the plurality of electromagnetic push rod structures 100 can be outputted at one position.

In an embodiment, the number of the working ends of the output rod 220 can also multiple, for example, the output rod 220 is a Y-shaped structure.

An end of the output rod 220 away from the working end can be provided with a threaded section whose outer diameter is smaller than the outer diameter of the main body part of the output rod 220. In this way, the threaded section of the output rod 220 penetrates through the connecting rod 210 and extends from the other side of the connecting rod 210, and then the output rod 220 can be connected to the connecting rod 210 through the nut 136.

The output rod 220 can be connected to the middle of the connecting rod 210.

For example, as shown in FIGS. 1 to 10, in the embodiment where the number of electromagnetic push rod structures 100 is two, two push rods 130 are connected to both ends of the connecting rod 210 respectively, and the output rod 220 is connected to the midpoint of the connecting rod 210.

In an embodiment where the number of electromagnetic push rod structures 100 is an even number greater than two, the plurality of push rods 130 are distributed along the length direction of the connecting rod 210, and the output rod 220 is connected to the midpoint of the connecting rod 210.

In an embodiment where the number of electromagnetic push rod structures 100 is an odd number, the output rod 220 and one of the electromagnetic push rod structures 100 are located on both sides of the midpoint of the connecting rod 210 respectively.

In some embodiments, as shown in FIGS. 1 to 10, the output joint 200 can further include a buffer head 230 and the buffer head 230 can be provided at the working end of the output rod 220.

The buffer head 230 can be made of materials with lower hardness, such as silica gel or rubber.

The buffer head 230 can be a block structure.

Alternatively and additionally, the buffer head 230 can be a cylindrical structure with one end open, such as a cylinder. The buffer head 230 can be sleeved on the working end of the output joint 200, and thus the working end of the output joint 200 can be wrapped.

The buffer head 230 is used to reduce the impact of the door opening device on the cabinet body or cabinet door and reduce the damage to the cabinet body or cabinet door.

In some embodiments, at least one of the plurality of push rods 130 is connected to the output joint 200 in a position-adjustable manner along the moving direction of the push rod 130.

In other words, the stroke of this push rod 130 can be reduced.

For example, for the electromagnetic push rod structures 100, the magnetic force of the solenoid 110 to the push rod 130 and the stroke of the push rod 130 have a high-order curve relationship, that is, the driving force of the push rod 130 and the stroke of the push rod 130 have a high-order curve relationship.

At an initial position (corresponding to that the cabinet door is closed), the driving force of the push rod 130 is small. As the push rod 130 moves toward the direction of pushing the door, the driving force of the push rod 130 increases rapidly.

On the contrary, when opening the door of the storage equipment, the resistance is usually the largest at the initial stage and becomes smaller at the later stage.

In the related art, in order to ensure that the cabinet door can be pushed to open, the electromagnetic push rod structure 100 with sufficient driving force is designed to ensure that the cabinet door can be pushed to open at the initial position. However, in this case, the thickness of the entire electromagnetic push rod structure 100 is large.

In an embodiment of the present application, the initial positions of the push rods 130 of some electromagnetic push rod structures 100 are adjusted to the position of opening the door, so that the driving force of the electromagnetic push rod structure 100 at the initial position is large.

The initial position of at least one of the plurality of push rods 130 remains unchanged, or at least one of the plurality of push rods 130 is connected to the output joint 200 in a position-nonadjustable manner along the moving direction of the push rod 130.

In this way, the total stroke of these initial position-nonadjustable electromagnetic push rod structures 100 remains unchanged.

For a door opening device including plurality of electromagnetic push rod structures 100 arranged in parallel, the total stroke of the door opening device is equal to the stroke of the electromagnetic push rod structure 100 with the largest stroke. That is, when the initial position of at least one of the plurality of push rods 130 remains unchanged, the stroke of the door opening device can be ensured.

Moreover, since the initial positions of some electromagnetic push rod structures 100 are adjusted to the position of opening the door, the driving force of the door opening device at the initial position is larger.

On the one hand, in the door opening device according to the embodiments of the present application, the abundant driving force in the middle and rear section of the stroke of the door opening device can be allocated to the front section of the stroke, which can not only increase the driving force in the early stage, but also reduce the waste of driving force in the later stage.

On the other hand, due to the increase of driving force in the early stage, the thickness of the electromagnetic push rod structure 100 can be made smaller, which makes the door opening device more practical.

Figure 7:
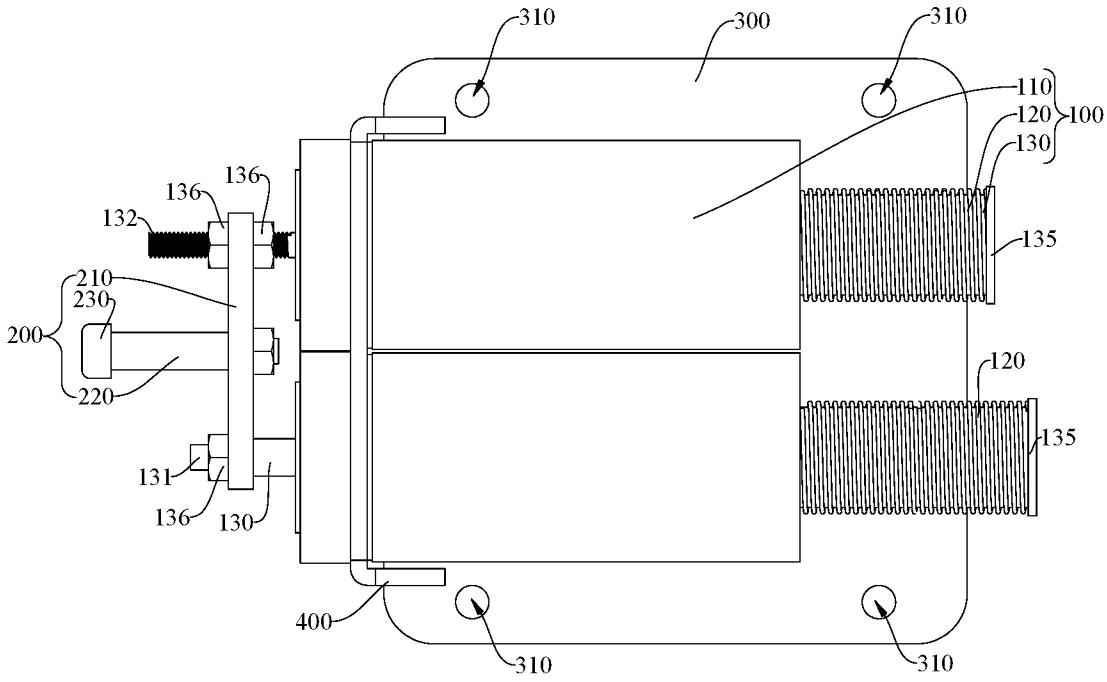
FIG. 7 is a seventh schematic structural diagram of the door opening device according to an embodiment of the present application.
Figure 8:
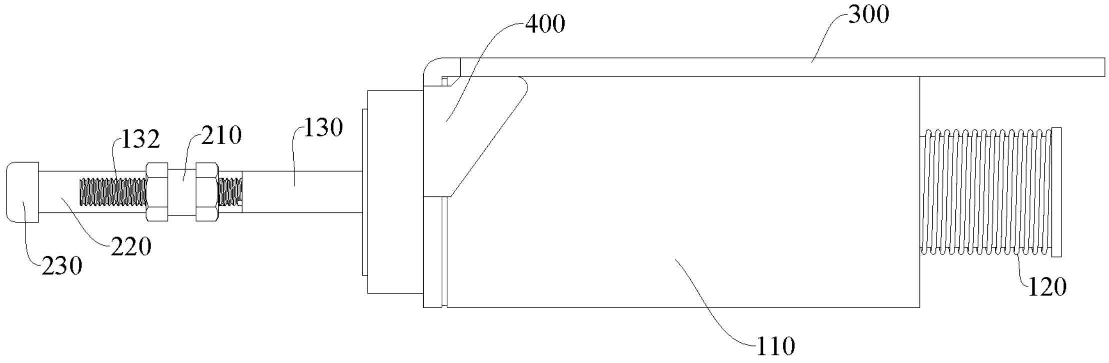
FIG. 8 is an eighth schematic structural diagram of the door opening device according to an embodiment of the present application.

As shown in FIGS. 7 and 9, taking the door opening device including two electromagnetic push rod structures 100 as an example, the initial position of the push rod 130 of one electromagnetic push rod structure 100 can be adjusted to the direction near the output joint 200, while the initial position of the push rod 130 of another electromagnetic push rod structure 100 remains unchanged.

In this way, the total stroke of the door opening device can remain unchanged, and the driving force at the initial position is larger.

When the door opening device includes more electromagnetic push rod structures 100, the initial position of the push rod 130 of one of the electromagnetic push rod structures 100 can remain unchanged, and the initial positions of the push rods 130 of the other electromagnetic push rod structures 100 can be adjusted to the direction of the output joint 200 to increase the initial driving force as much as possible.

In an embodiment, the adjusted size of the initial position of the push rod 130 needs to be set according to the actual situation as long as the basic requirement that the door can be pushed to move during the whole phase of opening the door is satisfied.

In some embodiments, as shown in FIGS. 5 to 8, at least one of the plurality of push rods 130 includes a threaded rod 132. As shown in FIGS. 5 to 8, one of the two push rods 130 includes the threaded rod 132 and the other of the two push rods 130 includes a common stepped connecting shaft 131.

The threaded rod 132 penetrates through the output joint 200, and the threaded rod 132 is connected to the output joint 200 in a position-adjustable manner through the nuts 136 on both sides of the output joint 200.

The initial position of the push rod 130 can be adjusted by controlling a precession depth of the nuts 136 on both sides of the output joint 200.

As shown in FIG. 7, the initial position of one of the push rods 130 is adjusted to the direction of the output joint 200. During the adjustment, it is needed to resist the elastic force of the elastic reset member 120, and thus the elastic reset member 120 corresponding to the push rod 130 is shortened compared with the other elastic reset member 120.

In some embodiments, as shown in FIG. 9, at least one of the plurality of push rods 130 includes an adjusting rod which penetrates through the output joint 200. The adjusting rod includes a positioning surface 134 extending along the moving direction of the push rod 130. The positioning surface 134 is planar, for example, the cross section of the adjusting rod can be D-shaped.

The output joint 200 is provided with a positioning hole communicating with the positioning surface 134. The adjusting rod is connected to the output joint 200 through the positioning member 137 in an adjustable manner. The adjusting rod penetrates through the positioning hole, and the adjusting rod abuts against the positioning surface 134.

The positioning hole can be a threaded hole, and correspondingly, the positioning member 137 can be a screw, such as a flat head screw; or the positioning hole can be a wedged hole, and correspondingly, the positioning member 137 can be a wedged pin.

The positioning surface 134 can be provided with anti-skid patterns, including a plurality of straight patterns or grid patterns arranged in parallel.

In some embodiments, as shown in FIGS. 1 to 10, the door opening device according to the embodiments of the present application can further include a base 300, which is provided with a mounting position 310 for mounting the door opening device. The mounting position 310 is used for mounting the door opening device on the cabinet body or cabinet door, and plurality of electromagnetic push rod structures 100 are mounted on the base 300.

The base 300 can be a flat plate, and the mounting position 310 can be a mounting hole provided on the flat plate, so that when the door opening device is mounted on the cabinet door or cabinet body, the threaded connecting member can penetrate through the mounting hole.

It should be noted that the mounting position 310 can further include other structures, including but not limited to positioning ribs, etc.

The housing of the electromagnetic push rod structure 100 can be welded to the base 300, or fixed to the base 300 through clips or threaded connecting members.

As shown in FIG. 1, FIG. 2, FIG. 5, FIG. 6, FIG. 7 and FIG. 9, the door opening device can further include a connecting rib 400. The connecting rib 400 is connected to the base 300 and the plurality of electromagnetic push rod structures 100.

The electromagnetic push rod structure 100 can be provided between the connecting rib 400 and the base 300, so that the electromagnetic push rod structure 100 can be clamped by the fasteners on both sides.

The connecting rib 400 can be a metal plate structure, and the connecting rib 400 can be welded with the base 300 and the plurality of electromagnetic push rod structures 100.

In some embodiments, as shown in FIGS. 1 to 9, the base 300 can be an integral plate structure. In this way, a plurality of electromagnetic push rod structures 100 are placed side by side on the base 300 and are fixedly connected to the base 300. The entire door opening device can be mounted by only connecting the base 300 to the cabinet body or the cabinet door.

In other embodiments, as shown in FIG. 10, the base 300 can be a multi-plate structure, for example, each electromagnetic push rod structure 100 is provided with a corresponding base 300, which can reduce the weight of the entire door opening device.

The storage equipment according to the embodiments of the present application is described below, and the storage equipment described below and the door opening device described above can be referred to each other.

The storage equipment can be a refrigerator, a display cabinet, a vending machine, a wardrobe, etc.

The storage equipment according to the embodiments of the present application includes a cabinet body, a cabinet door and a door opening device.

The cabinet door is mounted on the cabinet body in an openable and closable manner.

The door opening device is a door opening device in any of the above embodiments.

The door opening device is mounted on one of the cabinet body and the cabinet door, and the push rod 130 is used for pushing the other of the cabinet body and the cabinet door.

For example, one side of the cabinet door can be pivotally connected to the cabinet body, including pivotally connected through hinge or the connecting shaft 131. The door opening device is mounted on the side away from the pivot axis to increase the force arm.

Alternatively and additionally, the cabinet door is pull-out type or side hung type, and the door opening device can be mounted on the middle area.

In the storage equipment according to the embodiments of the present application, a door opening device with a smaller thickness can be used and a larger push force can be obtained through the synchronous action of the plurality of parallel electromagnetic push rod structures 100. The height of the entire storage equipment is decreased, which is convenient for transportation and mounting.

In some embodiments, the door opening device is mounted on the cabinet body, and a plurality of push rods 130 are used for pushing the same cabinet door. In this way, the cabinet door can be pushed by the plurality of electromagnetic push rod structures 100, the cabinet door is opened more stable, and the mount space on the cabinet body is more abundant.

In other embodiments, the door opening device can be mounted on the same cabinet door, and the plurality of push rods 130 are used for pushing the cabinet body. In this way, the cabinet body can be pushed by the plurality of electromagnetic push rod structures 100, and the cabinet door can be opened more stably due to the reaction force.

The device embodiments described above is only illustrative, in which the unit described as a separate component may be or may not be physically separated, and the component displayed as a unit may be or may not be a physical unit. That is, it may be located in one position or may be distributed to plurality of network units. Some or all of the modules may be selected according to the actual needs to achieve the purpose of the solutions in these embodiments. Those of ordinary skill in the art may understand and implement these embodiments without creative effort.

From the description of the above embodiments, those skilled in the art can clearly understand that each embodiment can be implemented by means of software plus a necessary general hardware platform, and certainly can also be implemented by hardware. Based on this understanding, the above solutions or the part of the solutions that contributes to the related art can be embodied in the form of a software product, and the computer software products can be stored in computer-readable storage media, such as ROM/RAM, magnetic disk, optical disk or the like, including several instructions for causing a computer device (which can be a personal computer, a server, or a network storage equipment or the like) to perform the methods described in various embodiments or some parts of the embodiments.

Finally, it should be noted that the above embodiments are only used to illustrate the solutions of the present application, but not to limit them; although the present application has been described in detail with reference to the foregoing embodiments, those of ordinary skill in the art should understand that: they can still modify the solutions described in the foregoing embodiments, or equivalently replace some features thereof; while these modifications or replacements do not make the essence of the corresponding solutions deviate from the scope of the solutions in the embodiments of the present application.

The above embodiments are only used to explain the present application, not to limit the present application. Although the present application has been described in detail with reference to embodiments, ordinary skill in the art should understand that various combinations, modifications or equivalent replacements of the solutions of the present application do not depart from the scope of the solutions of the present application, and should be covered in the scope of claims of the present application.

What is claimed is:

1. A door opening device, comprising:

a plurality of electromagnetic push rod structures, wherein each of the plurality of electromagnetic push rod structures comprises a push rod;

an output joint, wherein each of the push rods is connected to the output joint, wherein at least one of the push rods is connected to the output joint in a position-adjustable manner along a moving direction of the at least one push rod; and a controller, electrically connected to the plurality of electromagnetic push rod structures and configured to drive push rods of the plurality of electromagnetic push rod structures to act synchronously.

2. The door opening device of claim 1, wherein at least one of the push rods includes a threaded portion which passes through the output joint, and the threaded portion is connected to the output joint in a position-adjustable manner through nuts on both sides of the output joint.

3. The door opening device of claim 1, wherein at least one of the push rods comprises an adjusting portion which passes through the output joint, the adjusting portion comprises a positioning surface extending along a moving direction of the push rod, the output joint is provided with a positioning hole in communication with the positioning surface, the adjusting portion is connected to the output joint in an adjustable manner through a positioning member, and the positioning member passes through the positioning hole and abuts against the positioning surface.

4. The door opening device of claim 1, wherein the output joint comprises:

a connecting rod, connected to the plurality of push rods; and an output rod, connected to the connecting rod, wherein at least a portion of the output rod protrudes towards a direction away from the push rods relative to the connecting rod.

5. The door opening device of claim 4, wherein the output joint further comprises:

a buffer head, provided at a working end of the output rod.

6. The door opening device of claim 4, wherein the connecting rod is provided with a connecting hole, a tail end of each push rod is provided with a stepped connecting shaft, and the stepped connecting shaft penetrates through the connecting hole and is connected to the connecting rod.

7. The door opening device of claim 1, further comprising:

a base, provided with a mounting position for mounting the door opening device, wherein the plurality of electromagnetic push rod structures are mounted on the base.

8. The door opening device of claim 7, further comprising:

a connecting rib, connected to the plurality of electromagnetic push rod structures and the base.

9. A storage equipment, comprising:

a door opening device including:

a plurality of electromagnetic push rod structures, wherein each of the plurality of electromagnetic push rod structures comprises a push rod;

an output joint, each of the push rods being connected to the output joint, wherein at least one of the push rods includes a threaded portion which passes through the output joint, and the threaded portion is connected to the output joint in a position-adjustable manner through nuts on both sides of the output joint; and a controller, electrically connected to the plurality of electromagnetic push rod structures and configured to drive push rods of the plurality of electromagnetic push rod structures to act synchronously.

10. The storage equipment of claim 9, wherein at least one of the push rods is connected to the output joint in a position-adjustable manner along a moving direction of the push rod.

11. The storage equipment of claim 9, wherein at least one of the push rods comprises an adjusting portion which passes through the output joint, the adjusting portion comprises a positioning surface extending along a moving direction of the push rod, the output joint is provided with a positioning hole in communication with the positioning surface, the adjusting portion is connected to the output joint in an adjustable manner through a positioning member, and the positioning member passes through the positioning hole and abuts against the positioning surface.

12. The storage equipment of claim 9, wherein the output joint comprises:

a connecting rod, connected to the plurality of push rods; and an output rod, connected to the connecting rod, wherein at least a portion of the output rod protrudes towards a direction away from the push rods relative to the connecting rod.

13. The storage equipment of claim 12, wherein the connecting rod is provided with a connecting hole, a tail end of each push rod is provided with a stepped connecting shaft, and the stepped connecting shaft penetrates through the connecting hole and is connected to the connecting rod.

14. The storage equipment of claim 13, wherein the door opening device further comprises a base, the base including a mounting position for mounting the door opening device, wherein the plurality of electromagnetic push rod structures are mounted on the base.

15. A door opening device, comprising:

a plurality of electromagnetic push rod structures, wherein each of the plurality of electromagnetic push rod structures comprises a push rod;

an output joint, wherein each of the push rods is connected to the output joint; and a controller, electrically connected to the plurality of electromagnetic push rod structures and configured to drive push rods of the plurality of electromagnetic push rod structures to act synchronously, wherein at least one of the push rods comprises an adjusting portion which passes through the output joint, the adjusting portion comprises a positioning surface extending along a moving direction of the push rod, the output joint is provided with a positioning hole in communication with the positioning surface, the adjusting portion is connected to the output joint in an adjustable manner through a positioning member, and the positioning member passes through the positioning hole and abuts against the positioning surface.

16. A storage equipment, comprising:

a door opening device including:

a plurality of electromagnetic push rod structures, wherein each of the plurality of electromagnetic push rod structures comprises a push rod;

an output joint, each of the push rods being connected to the output joint, and a controller, electrically connected to the plurality of electromagnetic push rod structures and configured to drive push rods of the plurality of electromagnetic push rod structures to act synchronously, wherein the output joint comprises:

a connecting rod, connected to the plurality of push rods; and an output rod, connected to the connecting rod, wherein at least a portion of the output rod protrudes towards a direction away from the push rods relative to the connecting rod; and wherein the connecting rod is provided with a connecting hole, a tail end of each push rod is provided with a stepped connecting shaft, and the stepped connecting shaft penetrates through the connecting hole and is connected to the connecting rod.

* * * * *